US010663111B2

(12) United States Patent
Münker

(10) Patent No.: US 10,663,111 B2
(45) Date of Patent: May 26, 2020

(54) CARTRIDGE DEVICE FOR LUBRICATING A MACHINE

(71) Applicant: Poly-clip System GmbH & Co. KG, Hattersheim (DE)

(72) Inventor: Udo Münker, Langenselbold (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 293 days.

(21) Appl. No.: 15/586,067

(22) Filed: May 3, 2017

(65) Prior Publication Data

US 2017/0321844 A1    Nov. 9, 2017

(30) Foreign Application Priority Data

May 4, 2016    (EP) .................................... 16168435

(51) Int. Cl.
*F16N 19/00*    (2006.01)
*F16N 11/10*    (2006.01)
(Continued)

(52) U.S. Cl.
CPC ......... *F16N 19/00* (2013.01); *B65D 83/0005* (2013.01); *F16N 7/14* (2013.01); *F16N 11/10* (2013.01)

(58) Field of Classification Search
CPC . F16N 19/00; F16N 7/14; F16N 11/10; B65D 83/0005
See application file for complete search history.

(56) References Cited

U.S. PATENT DOCUMENTS 1,635,563 A * 7/1927 Sanford .................. B60R 17/00
                                                     184/105.1
1,998,164 A * 4/1935 Moody ..................... B67B 7/28
                                                     184/105.1
(Continued)

FOREIGN PATENT DOCUMENTS

CN          2508089 Y      8/2002
EP          0226424 A2     6/1987
JP          S56-125594     9/1981

OTHER PUBLICATIONS

CN2508089—Machine Translation (Year: 2001).*
(Continued)

*Primary Examiner* — Michael A Riegelman
(74) *Attorney, Agent, or Firm* — Fitch, Even, Tabin & Flannery LLP

(57) ABSTRACT

The invention relates to a cartridge device for lubricating a machine, preferably a clipping machine, having a pneumatic system and a pump unit driven by the pneumatic system, the cartridge device comprising a cartridge container for accommodating a supply of lubricant having a longitudinal axis defining a longitudinal direction, wherein the cartridge container comprises a first end portion and a second end portion located opposite the first end portion in the longitudinal direction, and a first closure element for detachably coupling the first end portion of the cartridge container to a suction side of the pump unit, wherein the first closure element has a delivery opening for supplying lubricant contained within the cartridge container to the suction side of the pump unit. The invention is characterized in that the first closure element is detachably coupleable to the first end portion of the cartridge container, the first end portion of the cartridge container being configured so as to allow a collapsible reservoir containing the supply of lubricant to be inserted into and removed from the cartridge container.

12 Claims, 7 Drawing Sheets

(51) Int. Cl.
*B65D 83/00* (2006.01)
*F16N 7/14* (2006.01)

(56) References Cited

U.S. PATENT DOCUMENTS

| | | | |
|---|---|---|---|
| 2,644,430 A | 7/1953 | Lang | |
| 3,109,463 A * | 11/1963 | Clemens | F16N 3/12 141/360 |
| 3,231,317 A * | 1/1966 | Dudar | B60R 17/00 184/6.4 |
| 4,385,714 A * | 5/1983 | Szabo | B65D 83/64 222/389 |
| 4,697,414 A * | 10/1987 | McCarty | F16N 7/30 184/6.11 |
| 4,741,155 A * | 5/1988 | McCarty | F16N 7/30 184/39 |
| 5,129,481 A * | 7/1992 | King | B65G 45/08 137/624.13 |
| 5,555,007 A * | 9/1996 | Ceschin | B41J 2/17506 222/83.5 |
| 6,935,541 B1 * | 8/2005 | Campbell | B05C 17/015 137/557 |
| 7,334,709 B1 * | 2/2008 | Huang | B05C 17/015 222/334 |
| 7,849,968 B1 * | 12/2010 | Krepps | F16N 39/06 184/1.5 |
| 8,434,524 B2 * | 5/2013 | Barth | F15B 1/04 138/26 |
| 9,127,567 B2 * | 9/2015 | Motto | F01D 25/18 |
| 2010/0140378 A1 | 6/2010 | Pilette et al. | |
| 2013/0206511 A1 * | 8/2013 | Hildenbrand | F16N 11/08 184/26 |
| 2013/0313051 A1 * | 11/2013 | Hung | F16N 5/02 184/41 |
| 2013/0327790 A1 * | 12/2013 | Ryan | F16N 19/00 222/95 |
| 2014/0367409 A1 * | 12/2014 | Digregorio | B65D 83/0005 222/389 |
| 2015/0069091 A1 * | 3/2015 | Mizoguchi | B05C 17/015 222/389 |
| 2016/0160856 A1 * | 6/2016 | Wallin | F04B 53/18 62/468 |
| 2016/0160857 A1 * | 6/2016 | Wallin | F25B 31/002 184/6.16 |
| 2017/0321844 A1 * | 11/2017 | Munker | B65D 83/0005 |
| 2018/0100619 A1 * | 4/2018 | Divisi | F16N 7/385 |
| 2018/0215524 A1 * | 8/2018 | Springhorn | B05C 17/01 |
| 2018/0297054 A1 * | 10/2018 | Mizoguchi | B05C 5/00 |
| 2018/0318870 A1 * | 11/2018 | Hung | B05C 17/00506 |

OTHER PUBLICATIONS

Extended European search report issued in corresponding European Application No. 16168435.2 dated Nov. 11, 2016 (11 pages).
SIPO; Chinese Application No. 201710303529.4; Office Action dated Aug. 27, 2018.
CNIPA; Application No. 201710303529.4; Office Action dated May 21, 2019.
EPO; Application No. 16168435.2; EPC Communication dated Feb. 24, 2020.

* cited by examiner

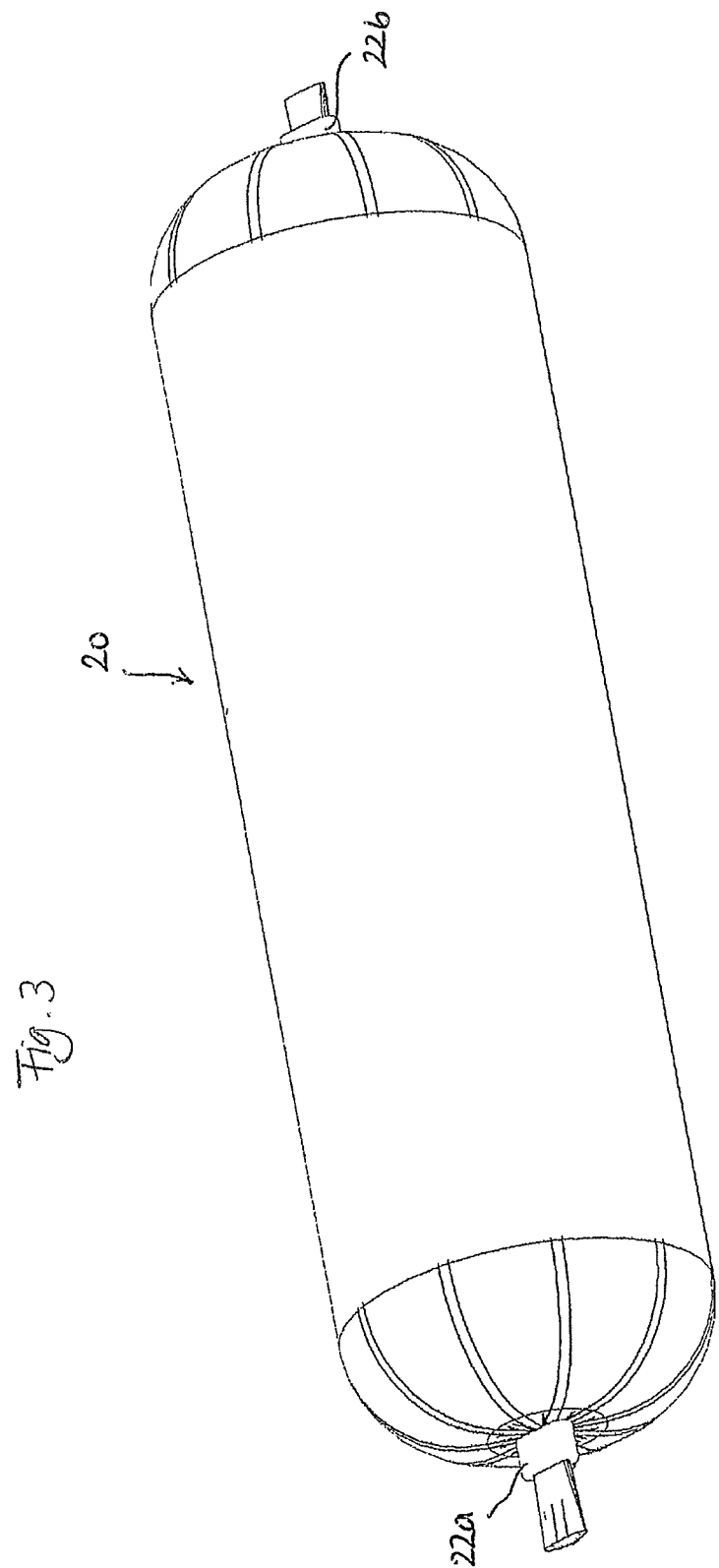

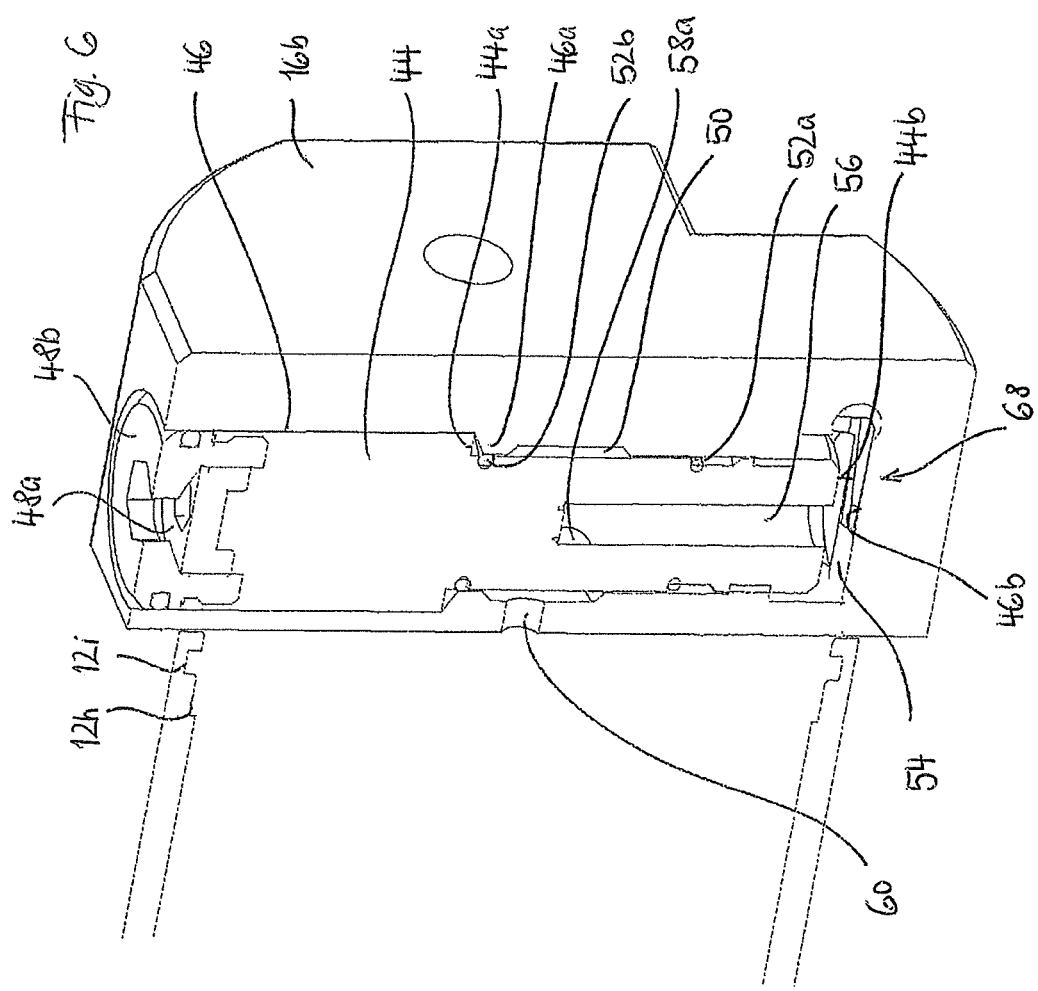

CARTRIDGE DEVICE FOR LUBRICATING A MACHINE

CROSS-REFERENCE TO RELATED APPLICATION

The present application claims the benefit of priority of European Patent Application No. 16168435.2 filed May 4, 2016, the contents of which are incorporated herein by reference in their entirety.

FIELD

The present invention relates to a cartridge device and a method for lubricating a machine, preferably a clipping machine, having a pneumatic system and a pump unit driven by the pneumatic system. The present invention further relates to a lubricating device comprising the cartridge device, and to a machine comprising the lubricating device. Further, the present invention relates to a use of the cartridge device with such a machine and to a use of a collapsible reservoir with the cartridge device.

BACKGROUND OF THE INVENTION

More precisely, the invention relates to a cartridge device for lubricating a machine, preferably a clipping machine, having a pneumatic system and a pump unit driven by the pneumatic system, the cartridge device comprising a cartridge container for accommodating a supply of lubricant having a longitudinal axis defining a longitudinal direction, wherein the cartridge container comprises a first end portion and a second end portion located opposite the first end portion in the longitudinal direction, and the cartridge device comprising a first closure element for detachably coupling the first end portion of the cartridge container to a suction side of the pump unit, wherein the first closure element has a delivery opening for supplying lubricant contained within the cartridge container to the suction side of the pump unit.

It is known in the art to lubricate a machine having a pneumatic system by connecting such a cartridge device having a cartridge container filled with lubricant to a pump unit driven by the pneumatic system of the machine. In the art, the cartridge container is closed off relative to the surrounding by means of a first closure element and a piston sealingly movable within the cartridge container. Generally, the cartridge container is made of a substantially rigid, non-collapsible plastics material. The first closure element is provided with a threaded collar to allow for a threaded attachment between the cartridge device and the pump unit. Upon use of the cartridge device, the tip of the threaded collar is to be cut off to provide a delivery opening for the lubricant. Once the supply of lubricant accommodated within the cartridge container is used up, the cartridge device is disposed of.

It is the object of the present invention to provide an easy to handle cartridge device for lubricating a machine having a pneumatic system and a pump unit driven by the pneumatic system that is more environmentally friendly and more cost-efficient than cartridge devices known in the art.

SUMMARY

The problem is solved by a cartridge device as set out above, wherein the first closure element is detachably coupled or coupleable to the first end portion of the cartridge container and wherein the first end portion of the cartridge container is configured so as to allow for a collapsible reservoir containing the supply of lubricant to be inserted into and removed from the cartridge container.

By allowing the first closure element to be detachably coupled to the first end portion of the cartridge container, for instance by means of a threaded engagement or a bayonet lock, the supply of lubricant may be contained within a collapsible reservoir which is to be inserted into the cartridge container. Once the supply of lubricant within the collapsible reservoir is used up, the collapsible reservoir is disposed of and the cartridge container may be reused by inserting a new collapsible reservoir into the same. The waste is thus limited to the collapsible reservoir compared to the cartridge container as it is known in the art.

The collapsible reservoir requires less material and is simpler to produce than the sturdy cartridge containers known in the art. In particular, the collapsible reservoir may be made of a thin packaging material such as an aluminium compound foil. Preferably, the collapsible reservoir is closed by clips made of metal or any other suitable material at either end.

Further, the cartridge container may be made of a material other than plastics, for instance metal such as stainless steel, which resists high temperatures and may thus be easily cleansed or sterilized. This may be of special importance in food applications. Preferably, the cartridge device is integrated into the machine to be lubricated and disassembled quickly to allow for a quick and easy refilling of the cartridge device with a collapsible reservoir.

The delivery opening may be formed within the first closure element such that the first closure element can be readily coupled to the suction side of the pump unit without having to cut off part of the first closure element or otherwise create a delivery opening within the first closure element for the supply of lubricant to the pump unit.

The first end portion is the end portion of the cartridge container which is coupled to the suction side of the pump unit, wherein the second end portion is the end portion of the cartridge container which is located remote from the suction side of the pump unit.

The cartridge device may further comprise a piston moveable in the longitudinal direction within the cartridge container, the piston fitting substantially airtight against an inner wall of the cartridge container.

The piston is advanced by the prevailing atmospheric pressure of the surrounding of the cartridge device during an operation of the pump unit because of a negative pressure developing within the cartridge container due to the sucking action of the pump unit. As a result, the piston applies additional pressure to the end of the collapsible reservoir remote from the suction side of the pump unit. This may prevent the collapsible reservoir from contracting or creasing due to the suction of the pump unit in a disadvantageous manner. For instance, the collapsible reservoir may crease in such a way that an amount of lubricant cannot be sucked out of the collapsible reservoir by the pump unit. Supporting the sucking action of the pump unit by providing an additional pressure by means of the piston at the end of the collapsible reservoir remote from the suction side of the pump unit may reduce or even eliminate this undesirable creasing behavior of the collapsible reservoir.

In order to refill the cartridge device with a new collapsible reservoir, the first closure element may be detached from the cartridge container. Since the piston is located at the first end portion of the cartridge device upon refilling, either the collapsible reservoir may be inserted via the first end portion to push the piston back towards the second end portion or the orientation of the cartridge container may be reversed such that the first end portion becomes the second end portion of the cartridge device and vice versa. To allow for a quick coupling and decoupling, the first closure element and the first end portion may be provided with a bayonet lock.

Additionally or alternatively to providing for example a piston within the cartridge container or to providing an easy access to the cartridge container being preferably not disassembled from the first closure element, the cartridge device may further comprise a second closure element provided at the second end portion of the cartridge container, wherein preferably the second closure element can comprise an air duct for providing a flow path into and out of the cartridge device.

Thus, the cartridge container is closed off at both ends thereof against the surroundings of the cartridge device. Merely the air duct provides for a communication between the cartridge container and its surroundings such that no negative pressure caused by the suction action of the pump unit establishes within the cartridge container. The air duct may simply be an opening within the second closure element or may be of a more elaborate construction.

The second closure element may be formed separately from the second end portion of the cartridge container. In particular, the second closure element may be detachably or fixedly connected to the second end portion. Alternatively, the second closure element may be formed integrally with the second end portion and may thus form part of the cartridge container. In this case, in order to refill the cartridge device it is not possible to simply reverse the orientation of the cartridge container. Instead, the cartridge container is to be filled via the first end portion thereof. The air duct ensures that air within the cartridge container which is replaced by the collapsible reservoir when filling the cartridge device therewith is vented out through the air duct of the second closure element.

The pump unit may be sensitive to an amount of air being sucked into the suction side thereof. It is thus preferable that the air duct of the second closure element is coupled or coupleable to the pneumatic system for providing a positive pressure between the piston and the second closure element, thereby moving the piston towards the first end portion.

By applying a positive pressure between the piston and the second closure element, air present within the collapsible reservoir may be pushed into the suction side of the pump unit, thereby supporting the sucking action of the pump unit. Moreover, it is possible to not only empty the collapsible reservoir by connecting the cartridge device to the suction side of a pump unit, but to actively apply an additional pressure at the end of the cartridge container remote from the suction side of the pump unit to facilitate emptying the collapsible reservoir. Instead of connecting the air duct to the pneumatic system of the machine, any other way of supplying an additional pressure at the end of the cartridge container remote from the suction side of the pump unit may be employed.

The pneumatic system of the machine may provide a pressure between 5 and 7 bar such that the positive pressure applied to the back of the piston, i.e. between the piston and the second closure element, may be between 0.5 bar and 3 bar. It has been found that a positive pressure of 2 bar allows for an operation of the pump unit and the cartridge device requiring low to no maintenance.

In order to refill the cartridge device with a new collapsible reservoir, both the first closure element and the second closure element may be detachably connected to the cartridge container such that the first and second closure elements may be detached from the cartridge container to bring the piston back to the second end portion as described above. To this end, the first closure element and the first end portion as well as the second closure element and the second end portion may be provided with a bayonet lock.

Further, the second closure element may comprise a safety valve having an open position and a closed position, the safety valve being biased towards the closed position and configured to move into the open position upon insertion of the collapsible reservoir into the cartridge container.

This allows the second closure element to remain coupled to the cartridge container during the refilling of the cartridge container with a new collapsible reservoir. For instance, the safety valve may ensure that during an insertion of a collapsible reservoir into the cartridge container via the first end portion no pressure builds up in an air supply line connecting the cartridge device to the pneumatic system. The air within the cartridge container that is being compressed by the movement of the piston towards the second end portion of the cartridge container upon refilling may be vented into the surrounding of the cartridge device via the safety valve.

The safety valve may also have a blocking position different from the closed position and be configured to move into the blocking position upon pneumatically coupling the air duct of the second closure element to the pneumatic system of the machine.

In this way, the safety valve may control both the supply of air into and the venting of air out of the cartridge device. The safety valve may be configured to open at a predetermined first pressure threshold but to close once the pressure exceeds a predetermined second pressure threshold which is greater than the first pressure threshold. Thus, the safety valve may be provided in the flow path for supplying air into and venting air out of the cartridge device. There is no need to separate the flow path for supplying air into the cartridge device from the flow path for venting air out of the same.

The first closure element may comprise at least one protrusion protruding from the first closure element towards the second end portion for piercing the collapsible reservoir so as to release lubricant therefrom.

By providing at least one protrusion at the first closure element it is not necessary to open the collapsible reservoir before inserting the same into the cartridge container. The collapsible reservoir is instead opened upon coupling the first closure element to the first end portion of the cartridge container. This facilitates the handling and refilling of the cartridge container.

Advantageously, when piercing a collapsible reservoir made of a thin packaging material, such as an aluminium compound foil, by means of protrusions provided at the first closure element, the material may rupture further due to the sucking action of the pump unit, thus releasing more lubricant.

It is preferable to prevent packaging material of the collapsible reservoir from blocking the delivery opening of the first closure element by providing at least one bar bridging over the delivery opening for detaining the collapsible reservoir within the cartridge container. The bar holds back packaging material of the collapsible reservoir which may otherwise be sucked towards the suction side of the pump unit.

According to another embodiment of the invention, a lubricating device for lubricating a machine having a pneumatic system comprises a cartridge device of the invention and a pump unit driven by the pneumatic system.

According to yet another embodiment of the invention, a machine having a pneumatic system comprises a lubricating device of the invention.

According to a development of such a machine, the machine comprises a quick coupling for detachably coupling the cartridge device of the lubricating device to the pneumatic system. This facilitates removing the cartridge device from the pump unit and thus the handling and possibly the refilling of the cartridge device.

According to another embodiment of the invention, a method for lubricating a machine having a pneumatic system and a pump unit driven by the pneumatic system using a cartridge device of the invention comprises the steps of inserting a collapsible reservoir into the cartridge container via the first end portion of the cartridge container, coupling the first closure element to the suction side of the pump unit, and coupling the first end portion of the cartridge container to the first closure element.

BRIEF DESCRIPTION OF THE DRAWINGS

One way of carrying out the invention is described in detail below with reference to the drawings which illustrate an embodiment in which:

FIG. 3 is a schematic perspective overview of a collapsible reservoir to be inserted into the cartridge device of FIG. 2;

FIG. 4 is a section view of a first closure element and a first end portion of the cartridge device of FIG. 2

FIG. 6 is a section view of the second closure element of the cartridge device of FIG. 2.

DETAILED DESCRIPTION

Figure 1:
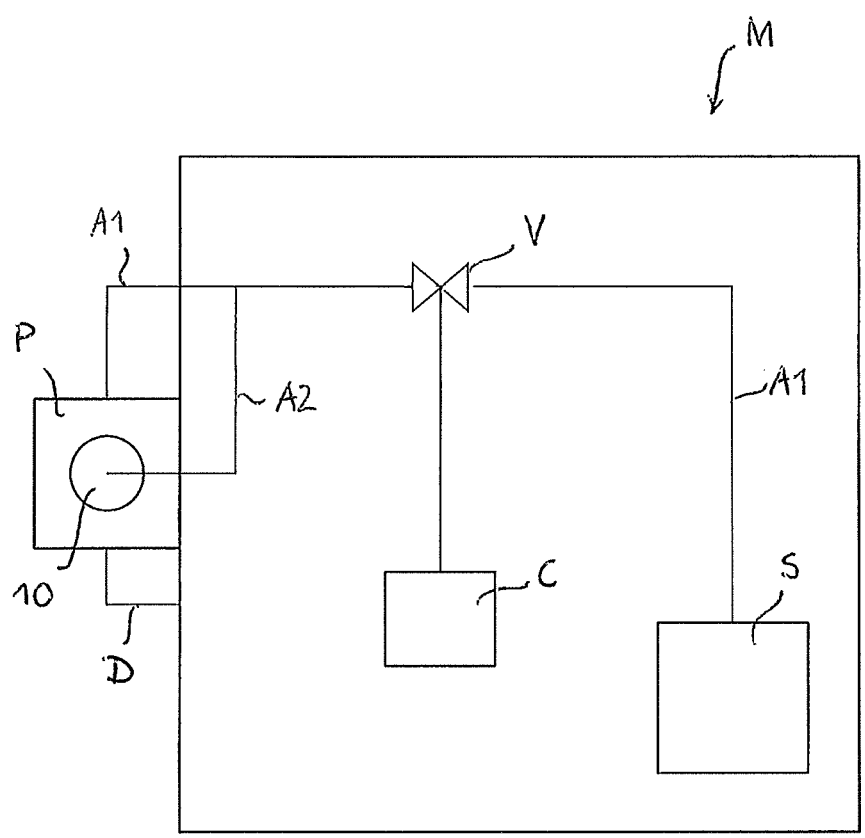
FIG. 1 illustrates schematically a machine to be lubricated with the cartridge device of the invention.

FIG. 1 schematically illustrates a machine M comprising a pneumatic system S connected via an air supply line A1 to a pump unit P to drive the same. Air supply line A1 may be pneumatically connected and disconnected from pneumatic system S by means of a valve V. Valve V may be controlled by a control unit C of machine M. When air supply line A1 is pneumatically connected to pump unit P by opening valve V, pump unit P is operated by the pressure provided by pneumatic system S. When air supply line A1 is disconnected from pump unit P by closing valve V, the supply of pressure from pneumatic system S and thus the operation of pump unit P stops. Pump unit P is connected to a cartridge device 10 as will be described in more detail below. Cartridge device 10 may be part of machine M or may be provided separately from machine M. Cartridge device 10 is provided with a supply of lubricant for lubricating machine M. By the operation of pump unit P, lubricant is delivered from cartridge device 10 via a lubricant line D to machine M.

An air supply line A2 preferably branches off from air supply line A1 downstream of valve V to provide a pressure to cartridge device 10 for assisting the release of lubricant from cartridge device 10. Alternatively, air supply line A2 may emanate directly from pneumatic system S such that air supply lines A1, A2 may be provided independently from each other.

Machine M may be a clipping machine comprising its own pneumatic system S, such as an automatic double-clipper, an automatic sealing/clipping machine, or an automatic hanging line which may be used in an automation line with defined clipping machines. Pneumatic system S of machine M is used for driving certain components of machine M. For instance, when machine M is a clipping machine, pneumatic system S may be used for driving the gathering or displacer plates of the clipping machine.

Pump unit P may be a known lubricating pump unit driven by the pneumatic system S of the machine M it is mounted on.

To lubricate machine M, pump unit P may be operated by the pneumatic system S of machine M in a lubricating phase in which the actual or intended operation of machine M is deactivated. The lubricating phase may be followed up by the actual or intended operation of machine M in which pump unit P is deactivated and air supply lines A1, A2 are disconnected from pneumatic system S by closing valve V.

Figure 2A:
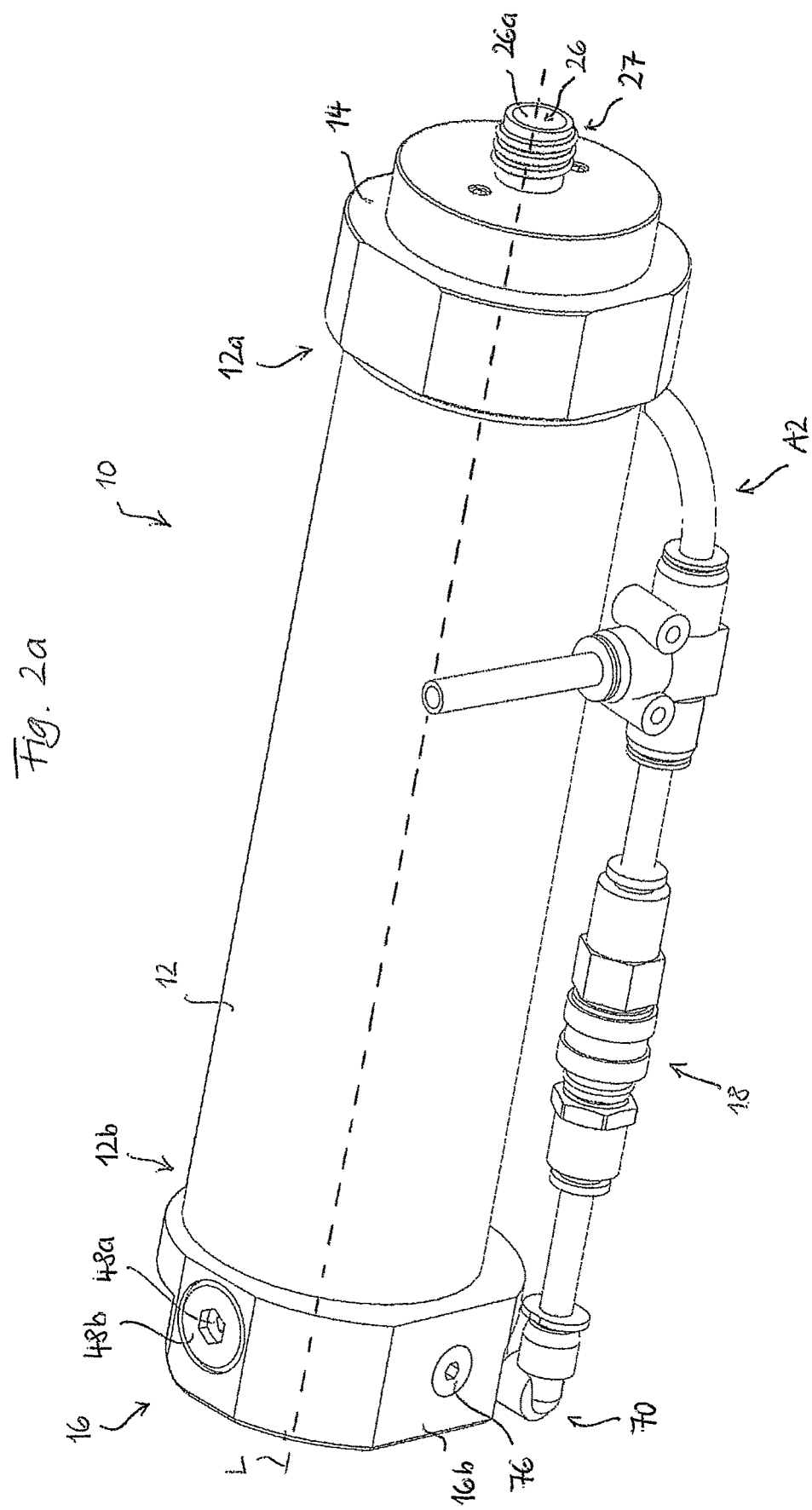
FIGS. 2a, 2b are schematic perspective overviews of a cartridge device of the invention.
Figure 2B:
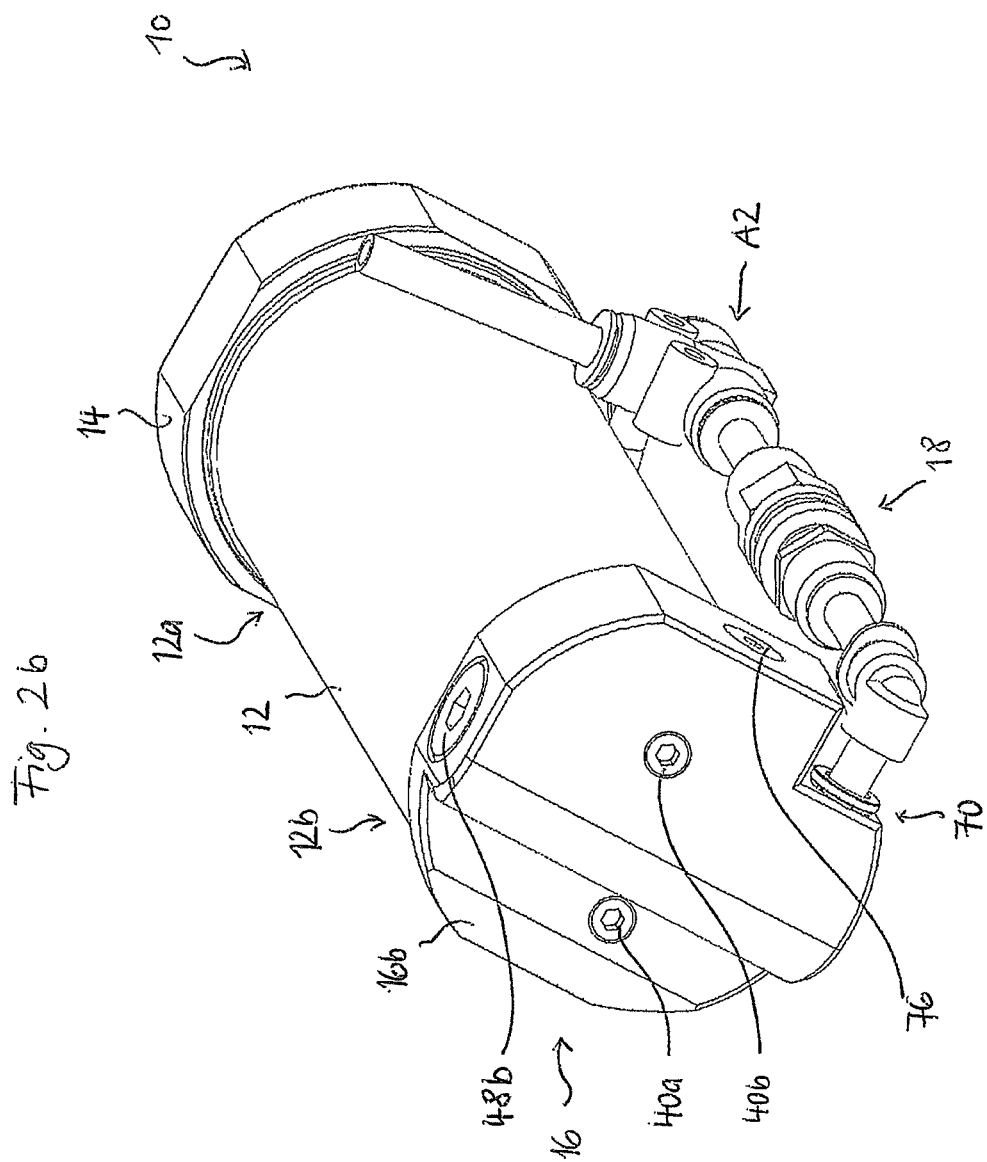
Figure 14:
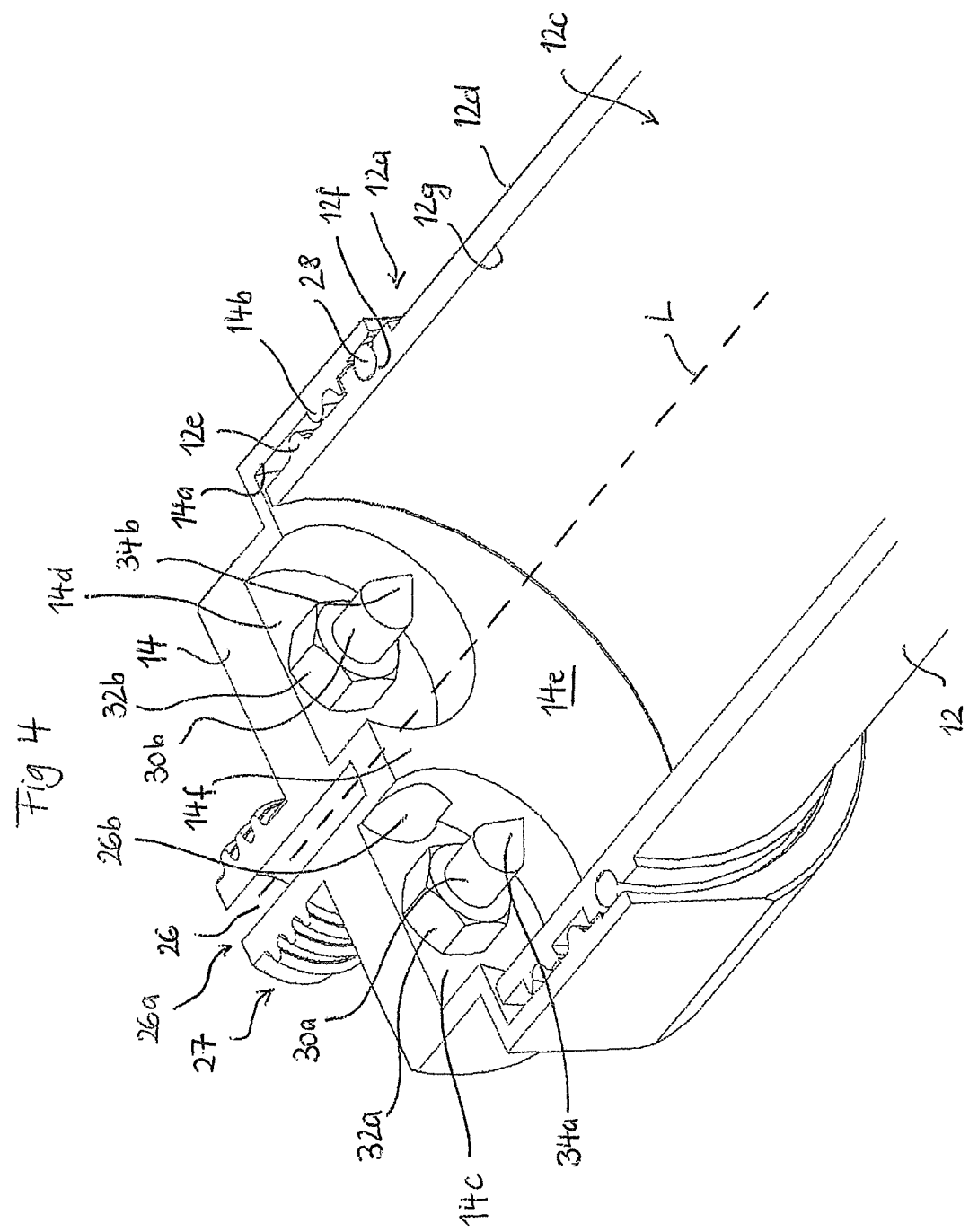

FIGS. 2a and 2b show a cartridge device 10 with a cartridge container 12. In this example, cartridge container 12 is formed as a cylindrical tube extending along a longitudinal axis L. However, any other shaped container or tube, such as a rectangular tube, may also be possible. Cylindrical tube 12 has a first end portion 12a and an opposing second end portion 12b. A first closure element 14 is detachably coupled to first end portion 12a, and a second closure element 16 is detachably coupled to second end portion 12b. Air supply line A2 branching off from air supply line A1 connects second closure element 16 to pneumatic system S as will be described in more detail below. Air supply line section A2 is provided with a quick coupling 18 for readily physically connecting and disconnecting air supply line A2 from pneumatic system S.

In use, a collapsible reservoir 20 as shown in FIG. 3 may exchangeably be inserted into cylindrical tube 12. Collapsible reservoir 20 may be formed of a thin packaging material, such as an aluminium compound foil, and closed by means of clips 22a, 22b. Collapsible reservoir 20 may be filled with a lubricant commonly used for lubricating machines, in particular for bearings of machines.

As can be seen from FIGS. 2 and 4, first closure element 14 is provided with a delivery duct 26 extending through a threaded collar 27 for detachably coupling first closure element 14 to pump unit P. Delivery duct 26 extends substantially parallel to longitudinal axis L. Delivery duct 26 allows an inner space 12c of cylindrical tube 12 to communicate with the surrounding of cartridge device 10, in particular the suction side of pump unit P. Delivery duct 26 has a first duct end 26a which, in an assembled state of delivery device 10, is positioned in proximity to the suction side of pump unit P, and a second duct end 26b remote from first duct end 26a. First duct end 26a of delivery duct 26 forms the delivery opening of cartridge device 10.

Referring to FIG. 4, cylindrical tube 12 is provided at its outer wall 12d with a thread 12e, and first closure element 14 is provided at its inner circumferential wall 14a with a thread 14b. First end portion 12a is in threaded engagement with first closure element 14 by means of threads 12e, 14b so as to provide a detachable coupling between cylindrical tube 12 and first closure element 14. Alternatively, first closure element 14 may be detachably coupled to first end portion 12a by means of a bayonet lock. An O-ring 28 is provided at first end portion 12a within an annular groove 12f formed within outer wall 12d so as to provide an airtight seal between cylindrical tube 12 and first closure element 14.

In this example, provided around delivery duct 26 of first closure element 14 are two threaded protrusions 30a, 30b extending along longitudinal axis L. Protrusions 30a, 30b are each provided within an indentation 14c, 14d of first closure element 14 indented towards delivery opening 26a relative to a side 14e of first closure element 14 facing second end portion 12b. Protrusions 30a, 30b are fixed by means of nuts 32a, 32b within indentations 14c, 14d such that pointed free ends 34a, 34b of protrusions 30a, 30b are directed towards the second end portion 12b. Thereby, protrusions 30a, 30b may pierce collapsible reservoir 20 disposed within cylindrical tube 12 when coupling first closure element 14 to first end portion 12a. In this regard, it may be preferable that threads 12e, 14b are configured such that cylindrical tube 12 may be mounted to first closure element 14 by a quarter turn of first end portion 12a relative to first closure element 14. However, instead of a quarter turn, a half turn or any number of turns, odd or even, may also be feasible.

It will be understood that one or more protrusions may be provided which may differ in shape and installation from protrusions 30a, 30b described in this example. For instance, alternatively to providing protrusions 30a, 30b which are detachably connected to first closure element 14, protrusions 30a, 30b may be provided integral with first closure element 14. In another example, protrusions 30a, 30b may be provided as blades for opening collapsible reservoir 20 predominantly by cutting rather than by piercing.

Delivery duct 26 is partially covered by a bar 14f formed between indentations 14c, 14d at side 14e of first closure element 14. Bar 14f is provided approximately across the centre of delivery duct 26 to prevent delivery duct 26 from becoming blocked or clogged up by one of clips 22a, 22b and/or by packaging material of collapsible reservoir 20. Instead, bar 14f holds back collapsible reservoir 20 in a manner that allows inner space 12c to communicate with delivery opening 26a when collapsible reservoir 20 is inserted into cylindrical tube 12.

Figure 5:
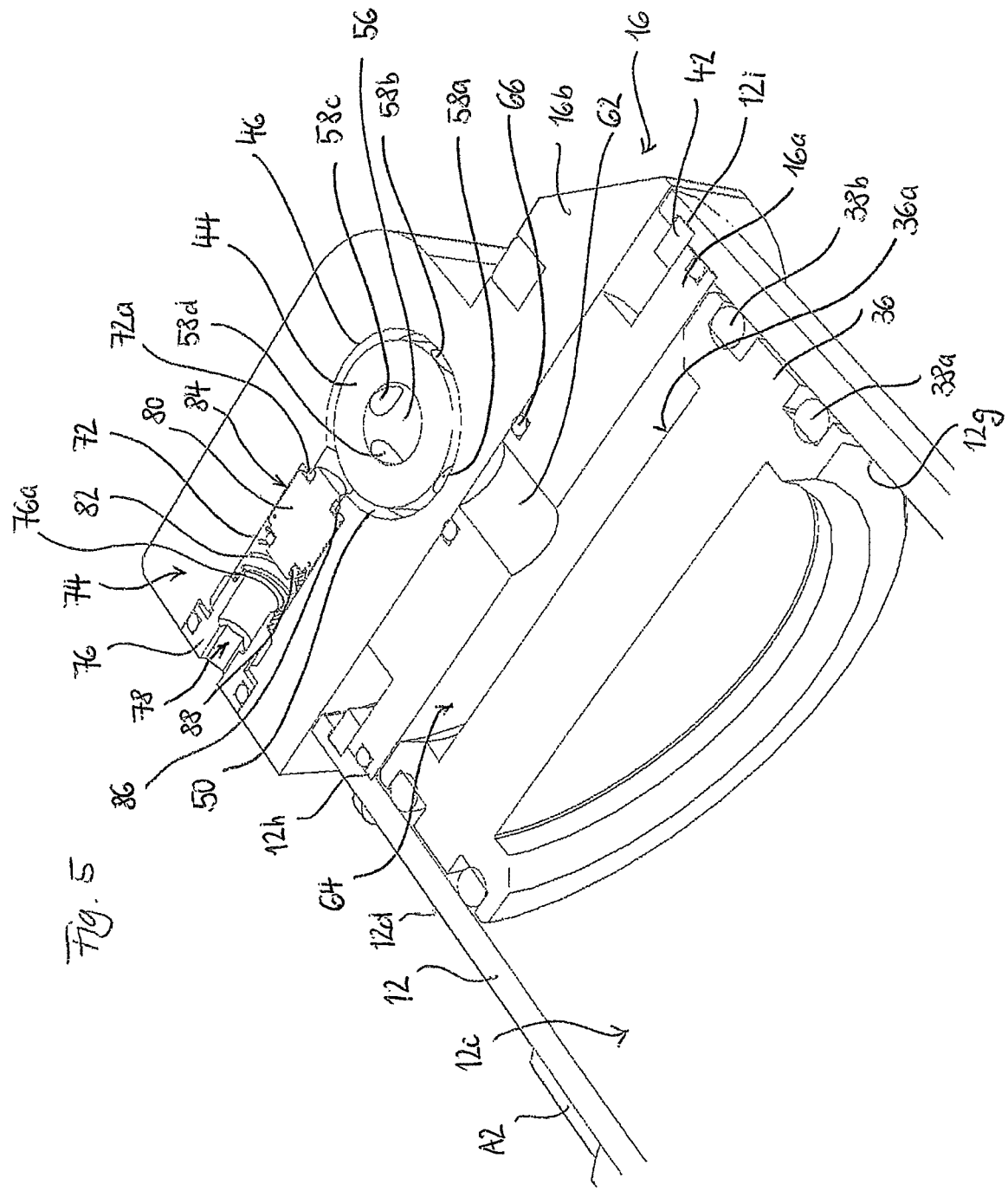
FIG. 5 is a section view of a second closure element and a second end portion of the cartridge device of FIG. 2.

Referring to FIG. 5, a piston 36 is sealingly and slidably inserted within inner space 12c of cylindrical tube 12. Piston 36 forms an airtight seal with an inner wall 12g of cylindrical tube 12 by means of two O-rings 38a, 38b. Second closure element 16 comprises an end plate 16a and an attachment member 16b mounted on end plate 16a by means of screws 40a, 40b (see FIG. 2b). End plate 16a is axially confined in a direction towards first end portion 12a by means of an annular shoulder 12h provided in inner wall 12g and in a direction towards second end portion 12b by means of a retaining ring 42 inserted within an annular groove 12i provided in inner wall 12g.

Referring to FIGS. 5 and 6, a stepped pin 44 is disposed within a stepped opening 46 of attachment member 16b and confined therein by means of fixing members 48a, 48b. Fixing member 48b is coupled to opening 46 my means of a threaded engagement (not shown). Stepped pin 44 extends perpendicular to longitudinal axis L and is supported within opening 46 by means of an annular shoulder 46a provided within opening 46 which engages an annular step shoulder 44a of pin 44. A ring space 50 is formed between pin 44 and opening 46 about midway of pin 44 and is sealed by means of two O-rings 52a, 52b. Between a bottom end 44b of pin 44 and a bottom end 46b of opening 46, a circular space 54 is formed. Ring space 50 and circular space 54 provide part of a flow path present within second closure element 16 which is described in detail below.

Pin 44 is provided with a blind hole 56 extending from bottom end 44b of pin 44 to about midway of pin 44. Blind hole 56 communicates with four passage openings 58a, 58b, 58c, 58d extending from blind hole 56 radially outwardly through pin 44 which in turn communicate with ring space 50. Ring space 50 communicates with a passage opening 60 (see FIG. 6) extending within attachment member 16b which in turn communicates with a passage opening 62 provided in end plate 16a (see FIG. 5). Passage opening 62 communicates with a cylindrical space 64 provided between piston 36 and end plate 16a. An O-ring 66 provides an airtight seal between attachment member 16b and end plate 16a.

Circular space 54, blind hole 56, passage openings 58a, 58b, 58c, 58d, ring space 50, passage opening 60, and passage opening 62 form an air duct 68 within second closure element 16. Air duct 68 receives a positive pressure from pneumatic system S of machine M via air supply line A2. The connection 70 between air supply line A2 and attachment member 16b is shown in FIG. 2. The positive pressure of air duct 68 is supplied to cylindrical tube 12 via passage opening 62 in end plate 16a such that the positive pressure may act upon a side 36a of piston 36 facing second closure element 16.

Referring again to FIG. 5, within attachment member 16b an opening 72 is provided for accommodating a safety valve 74. Safety valve 74 is confined within opening 72 by means of a fixing member 76 having a through-hole 78. Safety valve 74 extends perpendicular to pin 44. Safety valve 74 comprises a valve body 80 and an elastic return member 82 in the form of a resilient spring supported by fixing member 76. A ring space 84 is formed between opening 72 and valve body 80.

Spring 82 is biased towards the closed position in which valve body 80 is pressed against a first valve seat 72a. First valve seat 72a is provided by an annular step shoulder of opening 72. In the closed position of safety valve 74, an O-ring 86 provides a seal between valve body 80 and first valve seat 72a and reduces sound caused by valve body 80 impacting on first valve seat 72a.

Fixing member 76 provides a second valve seat 76a for valve body 80 remote from first valve seat 72a. When valve body 80 is pressed against second valve seat 76a, safety valve 74 is in its blocking position. In the blocking position of safety valve 74, an O-ring 88 provides a seal between valve body 80 and second valve seat 76a and reduces sound caused by valve body 80 impacting on second valve seat 76a.

When safety valve 74 is in the closed position or in the blocking position, through-hole 78 is blocked off from air duct 68 by means of valve body 80 being pressed against first valve seat 72a or second valve seat 76a, respectively. When safety valve 74 is in the open position and not in the closed or in the blocking position, air duct 68 communicates via ring space 84 and through-hole 78 with the surrounding of cartridge device 10.

Valve body 80 moves from the closed position into the open position when the pressure within air duct 68 exceeds a predetermined first pressure threshold. When the pressure within air duct 68 exceeds a predetermined second pressure threshold which is greater than the predetermined first pressure threshold, valve body 80 is moved into the blocking position.

With reference to FIGS. 2, 5 and 6, the function of cartridge device 10 is explained.

To lubricate machine M, cylindrical tube 12 filled with collapsible reservoir 20 and connected with second closure element 16 is threadedly coupled to first closure element 14 by means of threads 12e, 14b, whereby collapsible reservoir 20 is slit open by protrusions 30a, 30b. First closure element 14 is already threadedly coupled to the suction side of pump unit P by means of threaded collar 27. Then, by opening valve V, air supply line A1 is pneumatically connected to pump unit P so as to drive the same, and air supply line A2 is pneumatically connected to cartridge device 10, i.e. attachment member 16b of second closure element 16, so as to supply pressure to air duct 68. Upon connecting air duct 68 to pneumatic system S of machine M, the pressure within air duct 68 exceeds the predetermined second threshold such that valve body 80 is pressed against second valve seat 76a, i.e. safety valve 74 is pressed into its blocking position. In the blocking position of safety valve 74, air duct 68 cannot communicate with through-hole 78 of safety valve 74. As a result, pressure builds up within cylindrical space 64 and piston 36 is pushed towards first end portion 12a of cylindrical tube 12. Thereby, collapsible reservoir 20 received within inner space 12c of cylindrical tube 12 is deformed and lubricant contained therein is released through delivery opening 26a formed within first closure element 14.

Once reservoir 20 is used up and piston 36 has advanced towards first end portion 12a, air supply lines A1, A2 are pneumatically disconnected from pneumatic system S by closing valve V. Air within air supply lines A1, A2 downstream of valve V is vented into the surrounding of cartridge device 10 via pump unit P such that safety valve 74 moves back from the blocking position to the closed position. Cartridge device 10 may then be decoupled from first closure element 14 which remains coupled to the suction side of pump unit P and used up reservoir 20 may be removed from inner space 12c of cylindrical tube 12. There is no need to decouple second closure element 16 from second end portion 12b such that second closure element 16 remains mounted on second end portion 12b during lubrication of machine M and refill of cartridge device 10.

To refill cartridge device 10, a new reservoir 20 is inserted into cylindrical tube 12 via first end portion 12a. Upon inserting new reservoir 20 into cylindrical tube 12, piston 36 is pushed towards second closure element 16. As a result, pressure builds up within cylindrical space 64 communicating with passage opening 62 of end plate 16a and ring space 50 of attachment member 16b. When the build up pressure exceeds the predetermined first pressure threshold, valve body 80 is moved from the closed position into the open position and vents air out of cartridge device 10.

The predetermined first pressure threshold and the predetermined second pressure threshold may be adjusted such that safety valve 74 is not moved into the blocking position upon refilling cartridge device 10. The predetermined first pressure threshold may be equal to or greater than the atmospheric pressure prevailing within the surrounding of cartridge device 10.

LIST OF PARTICULARS

A1 air supply line
A2 air supply line
B pneumatic system
C control unit
D lubricating line
L longitudinal axis
M machine
P pump unit
V valve
10 cartridge device
12 cartridge container (cylindrical tube)
12a first end portion
12b second end portion
12c inner space
12d outer wall
12e thread
12f groove
12g inner wall
12h shoulder
12i groove
14 first closure element
14a inner circumferential wall
14b thread
14c, 14d indentations
14e side
14f bar
16 second closure element
16a end plate
16b attachment member
18 quick coupling
20 collapsible reservoir
22a, 22b clips
26 delivery duct
26a delivery opening
26b second duct end
27 threaded collar
28 O-ring
30a, 30b protrusions
32a, 32b nuts
34a, 34b pointed free ends
36 piston
38a, 38b O-rings
40 screws
42 retaining ring
44 pin
44a shoulder
44b bottom end
46 opening
46a shoulder
46b bottom end
48a, 48b fixing members
50 ring space
52a, 52b O-rings
54 circular space
56 blind hole
58a-58d passage openings
60 passage opening
62 passage opening
64 circular space
66 O-ring
68 air duct
70 connection
72 opening
72a first valve seat
74 safety valve
76 fixing member
76a second valve seat
78 through-hole
80 valve body
82 elastic return member (resilient spring)
84 ring space
86 O-ring
88 O-ring

What is claimed is:

1. A cartridge device for lubricating a machine having a pneumatic system and a pump unit driven by the pneumatic system, the cartridge device comprising:
   a cartridge container for accommodating a supply of lubricant having a longitudinal axis defining a longitudinal direction, wherein the cartridge container comprises a first end portion and a second end portion located opposite the first end portion in the longitudinal direction, and a first closure element for detachably coupling the first end portion of the cartridge container to a suction side of the pump unit, wherein the first closure element has a delivery opening for supplying lubricant contained within the cartridge container to the suction side of the pump unit, wherein the first closure element is detachably coupleable to the first end portion of the cartridge container, the first end portion of the cartridge container being configured so as to allow for a collapsible reservoir containing the supply of lubricant to be inserted into and removed from the cartridge container, and wherein the first closure element comprises at least one bar bridging over the delivery opening of the first closure element for detaining the collapsible reservoir within the cartridge container.

2. The cartridge device of claim 1,
further comprising a piston moveable in the longitudinal direction within the cartridge container, the piston fitting substantially airtight against an inner wall of the cartridge container.

3. The cartridge device of claim 1,
further comprising a second closure element provided at the second end portion of the cartridge container, wherein the second closure element comprises an air duct for providing a flow path into and out of the cartridge device.

4. The cartridge device of claim 3,
wherein the air duct of the second closure element is coupleable to the pneumatic system of the machine for providing a positive pressure between a piston moveable in the longitudinal direction within the cartridge container and the second closure element, thereby moving the piston towards the first end portion.

5. The cartridge device of claim 3,
wherein the second closure element comprises a safety valve having an open position and a closed position, the safety valve being biased towards the closed position and configured to move into the open position upon insertion of the collapsible reservoir into the cartridge container.

6. The cartridge device of claim 5,
wherein the safety valve has a blocking position different from the closed position and is configured to move into the blocking position upon pneumatically coupling the air duct of the second closure element to the pneumatic system of the machine.

7. The cartridge device of claim 6,
wherein the safety valve is configured to move from the closed position to the open position at a predetermined first pressure threshold within the air duct and to move to the blocking position at a predetermined second pressure threshold within the air duct, wherein the predetermined first pressure threshold is lower than the predetermined second pressure threshold.

8. The cartridge device of claim 1,
wherein the first closure element comprises at least one protrusion protruding from the first closure element towards the second end portion for piercing the collapsible reservoir so as to release lubricant therefrom.

9. The cartridge device according to claim 1 in combination with the machine having the pneumatic system and the pump unit.

10. A machine comprising:
a pneumatic system,
a pump unit driven by the pneumatic system,
a cartridge, device
a cartridge container of the cartridge device for accommodating a supply of lubricant having a longitudinal axis defining a longitudinal direction, wherein the cartridge container comprises a first end portion and a second end portion located opposite the first end portion in the longitudinal direction, and
a first closure element of the cartridge device for detachably coupling the first end portion of the cartridge container to a suction side of the pump unit, wherein the first closure element has a delivery opening for supplying lubricant contained within the cartridge container to the suction side of the pump unit, wherein the first closure element is detachably coupleable to the first end portion of the cartridge container, the first end portion of the cartridge container being configured so as to allow for a collapsible reservoir containing the supply of lubricant to be inserted into and removed from the cartridge container, and wherein the first closure element comprises at least one bar bridging over the delivery opening of the first closure element for detaining the collapsible reservoir within the cartridge container.

11. The machine according to claim 10,
further comprising a quick coupling for detachably coupling the cartridge device to the pneumatic system.

12. A method for lubricating a machine using a cartridge device, the machine having a pneumatic system and a pump unit driven by the pneumatic system, the method comprising the following steps:
inserting a collapsible reservoir containing a supply of lubricant into a cartridge container of the cartridge device via a first end portion of the cartridge container,
coupling a first closure element of the cartridge container to a suction side of the pump unit, and
coupling the first end portion of the cartridge container to the first closure element to allow a delivery opening of the first closure element to supply the lubricant to a suction side of the pump unit and whereby at least one bar of the first closure element bridges over the delivery opening for detaining the collapsible reservoir within the cartridge container.

* * * * *